(12) United States Patent
Smith (10) Patent No.: US 10,632,784 B2
(45) Date of Patent: Apr. 28, 2020

(54) SUPPORT SURFACE FOR CONSTRUCTING STAINED GLASS

(71) Applicant: V. C. Smith, Cornelius, NC (US)

(72) Inventor: V. C. Smith, Cornelius, NC (US)

( * ) Notice: Subject to any disclaimer, the term of this patent is extended or adjusted under 35 U.S.C. 154(b) by 106 days.

(21) Appl. No.: 15/494,171

(22) Filed: Apr. 21, 2017

(65) Prior Publication Data

US 2018/0304673 A1 Oct. 25, 2018

(51) Int. Cl.
| | |
|---|---|
| *B23K 37/04* | (2006.01) |
| *B23Q 1/42* | (2006.01) |
| *B23Q 1/62* | (2006.01) |
| *B44C 5/08* | (2006.01) |
| *C03C 17/00* | (2006.01) |
| *B23K 1/19* | (2006.01) |
| *B23K 103/00* | (2006.01) |

(52) U.S. Cl.
CPC ............... *B44C 5/08* (2013.01); *B23K 1/19* (2013.01); *B23K 37/0408* (2013.01); *B23Q 1/42* (2013.01); *B23Q 1/62* (2013.01); *C03C 17/002* (2013.01); *B23K 2103/54* (2018.08)

(58) Field of Classification Search
CPC ......... B44C 5/08; B23K 37/0408; B44F 1/00; B44F 1/06; B44F 3/00; B27G 13/00; B27G 5/00; B27G 5/04; B23Q 1/42; B23Q 1/62; B23Q 1/628; B23Q 1/262
USPC ........ 269/305, 307, 310, 291, 111, 112, 113, 269/87.2; 83/468.2–468.3, 452–466
See application file for complete search history.

(56) References Cited

U.S. PATENT DOCUMENTS

| | | | | |
|---|---|---|---|---|
| 380,683 A | * | 4/1888 | James | B27B 27/04 |
| | | | | 83/468.2 |
| 2,281,469 A | * | 4/1942 | Weddle | B27F 5/10 |
| | | | | 269/87.2 |
| 2,836,242 A | * | 5/1958 | Ervin | B23D 33/10 |
| | | | | 83/468.7 |
| 4,880,221 A | * | 11/1989 | Richards | B25B 5/10 |
| | | | | 269/139 |
| 5,085,414 A | * | 2/1992 | Weaver | B23Q 16/001 |
| | | | | 269/304 |
| 2012/0192616 A1 | * | 8/2012 | Wang | G01N 3/04 |
| | | | | 73/9 |

* cited by examiner

*Primary Examiner* — Tyrone V Hall, Jr.
*Assistant Examiner* — Abbie E Quann
(74) *Attorney, Agent, or Firm* — Clements Bernard Walker (57) ABSTRACT

A surface support for constructing a stained glass design having a flat central surface (12), surface frames (14) bounding all sides of the flat central surface (12), a stationery edge boundary (15) securely mounted on one of the surface frames (14), preferably the frame closest to the artist, 2 side adjustable members (18) mounted in a manner as to be slideable toward or away from one another, and capable of sliding over said flat central surface (12) and the surface frames 14, and a slideable boundary support (24) positioned to slide on side adjustable members (18) toward or away from the stationary edge boundary (15) and slide over the flat central surface (12).

6 Claims, 9 Drawing Sheets

SUPPORT SURFACE FOR CONSTRUCTING STAINED GLASS

FIELD OF THE INVENTION

The present invention is directed to a flat surface with movable or adjustable boundaries to aid in constructing stained glass works of art. A design is created, the glass is cut, the edges of the glass are ground, and the glass is assembled into the designed work of art, and then the pieces of glass are soldered in place with lead or other metals. The present invention provides a flat surface for assembling the cut and ground pieces of stained glass and a non-movable edge (when locked) to allow a firm edge to push/secure the designed work of art against insuring a tight solder.

More specifically, the size of the design is determine and the boundaries of the support surface are then moved or positioned to reflect the designed size of the work of art, such that the pieces can be assembled to create the design within the boundaries.

SUMMARY OF THE INVENTION

A surface support for constructing a stained glass design has a flat central surface (12), surface frames (14) bounding all sides of the flat central surface (12), a stationery edge boundary (15) securely mounted on one of the surface frames (14), preferably the frame closest to the artist, 2 side adjustable members (18) mounted in a manner as to be slideable toward or away from one another, and capable of sliding over said flat central surface (12) and the surface frames 14, and a slideable boundary support (24) positioned to slide on side adjustable members (18) toward or away from the stationary edge boundary (15) and slide over the flat central surface (12).

DESCRIPTION OF THE EMBODIMENTS

The support surface for constructing stained glass can be made from any suitable material such as wood, plastic, metal, oxides, composites, laminates, etc. Further it can be any desired size depending on the size of the stained glass work of art being constructed. Certain fasteners noted in the discussion below are made from metal or oxides as is well known in the art.

Figure 1:
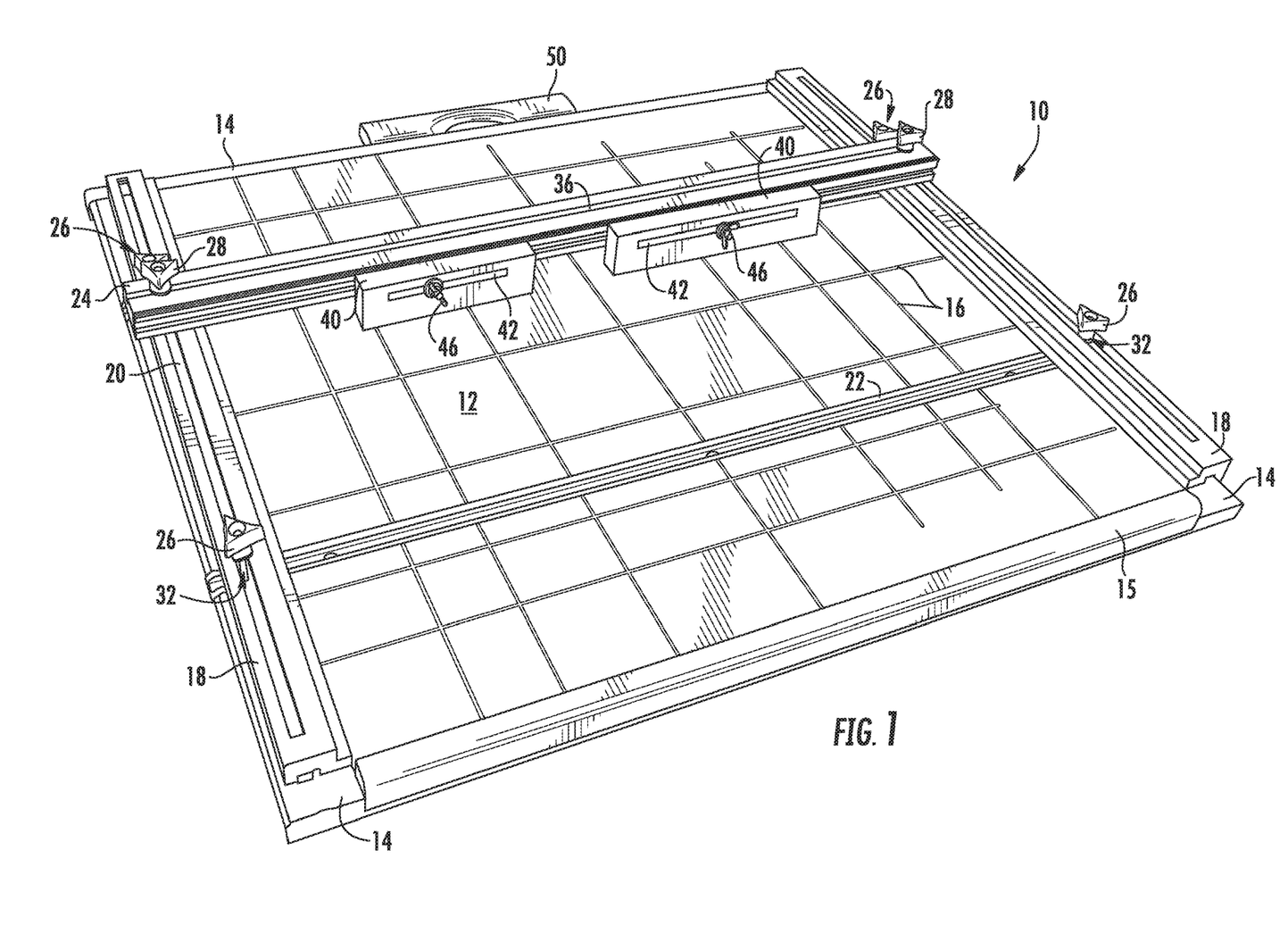
FIG. 1 is a perspective view of the support surface.
Figure 2:
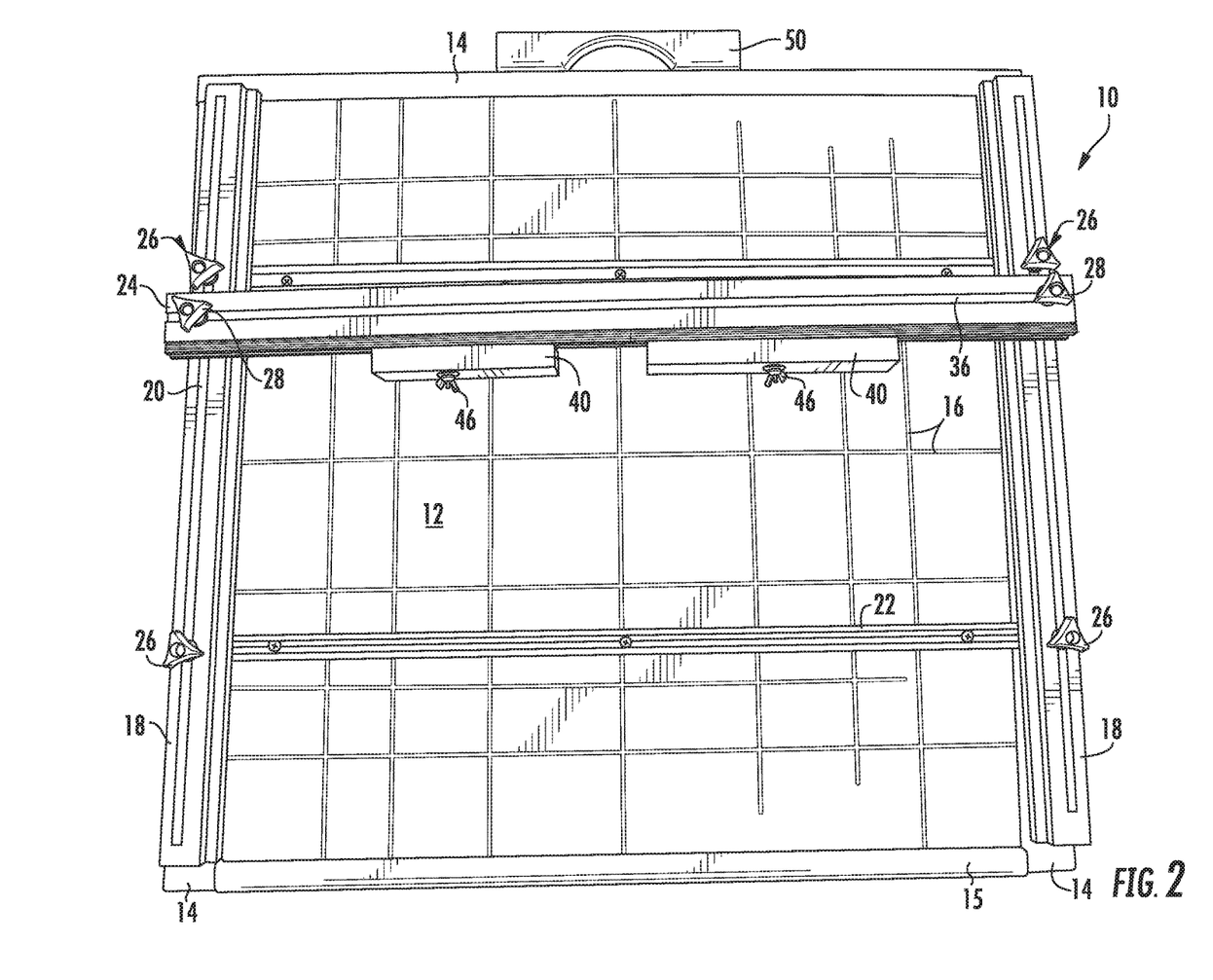
FIG. 2 is an overhead view of the support surface.

In FIG. 1, the support surface 10 comprises a central surface 12 upon which the pieces of stained glass are placed to construct a desired design. Surrounding the central surface 12 is a frame 14. Thus the frame 14 may be made from wood or any suitable material, while the central surface 12 may be made from wood, or composite material, or any suitable material. At one end of the support surface 10 is an edge boundary 15 that is approximately the thickness of the stained glass. Edge boundary 15 is stationary, unlike all the other members (particularly items 18 and 24 as described below) that bound the working portion of the central surface 12.

Upon the central surface 12 are a plurality of guidelines 16 that aid in keeping the stained glass square or within the work of art design, depending upon the designed shape. Also the guidelines 16 allow the user of the support surface 10 to keep other boundary members parallel or within the work of art design. On each side of the central surface 12 are side adjustable members 18. Each side adjustable member 18 has an elongated slot 20 extending there through. On the central surface 12 are at least 2 embedded cross channels 22, whose upper edges are level with the surface of the central surface 12. These embedded cross channels 22 may be secured to the central surface 12 by means of glue or fasteners such as screws. The embedded cross channels 22 are parallel with the edge boundary 15. Across the central surface 12 from the edge boundary 15 is a slideable boundary support 24. For designs having 4 sides such as square designs, rectangle designs or parallelogram designs, edge boundary 15, side adjustable members 18, and slideable boundary support 24 will frame the stained glass design. As indicated by the name of the items 18 and 24, they are each adjustable to the desired size of the stained glass, i.e., the side adjustable members 18 can be moved toward or away from one another, and the slideable boundary support 24 can be moved toward or away from edge boundary 15.

Figure 3:
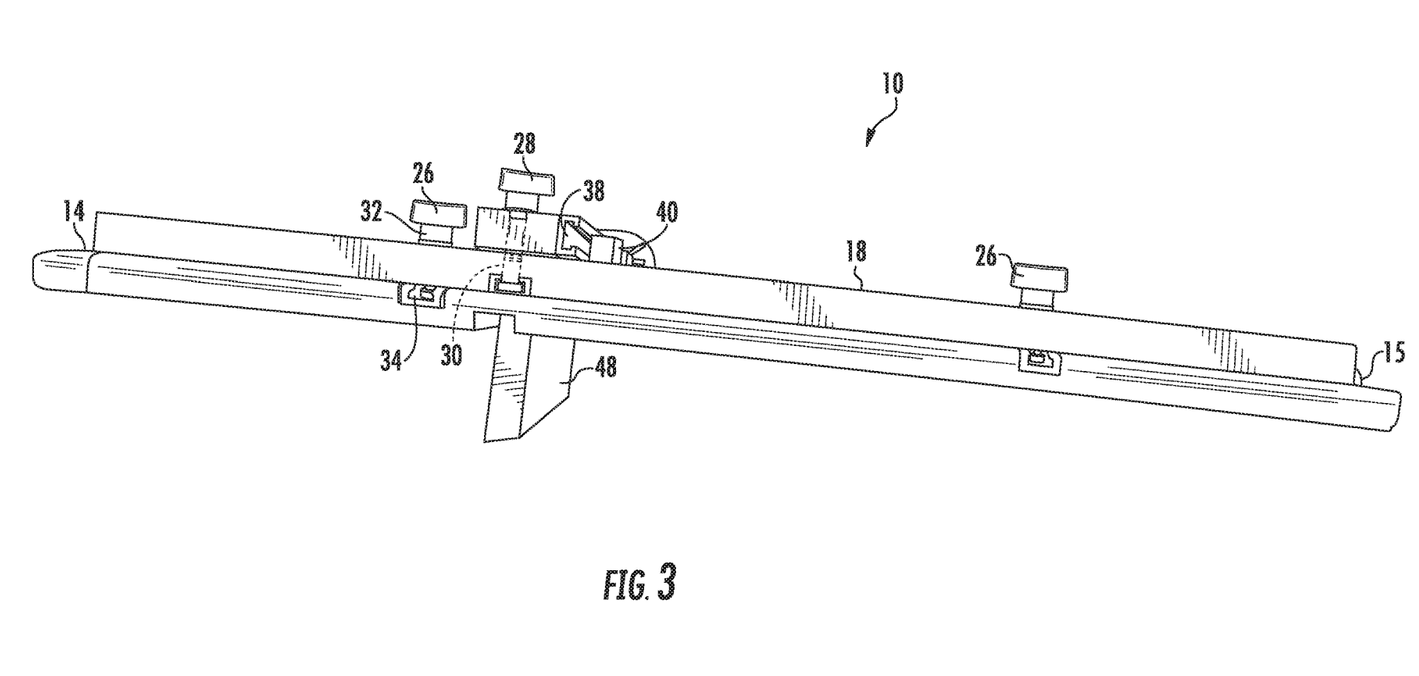
FIG. 3 is a side edge view of the support surface.
Figure 4:
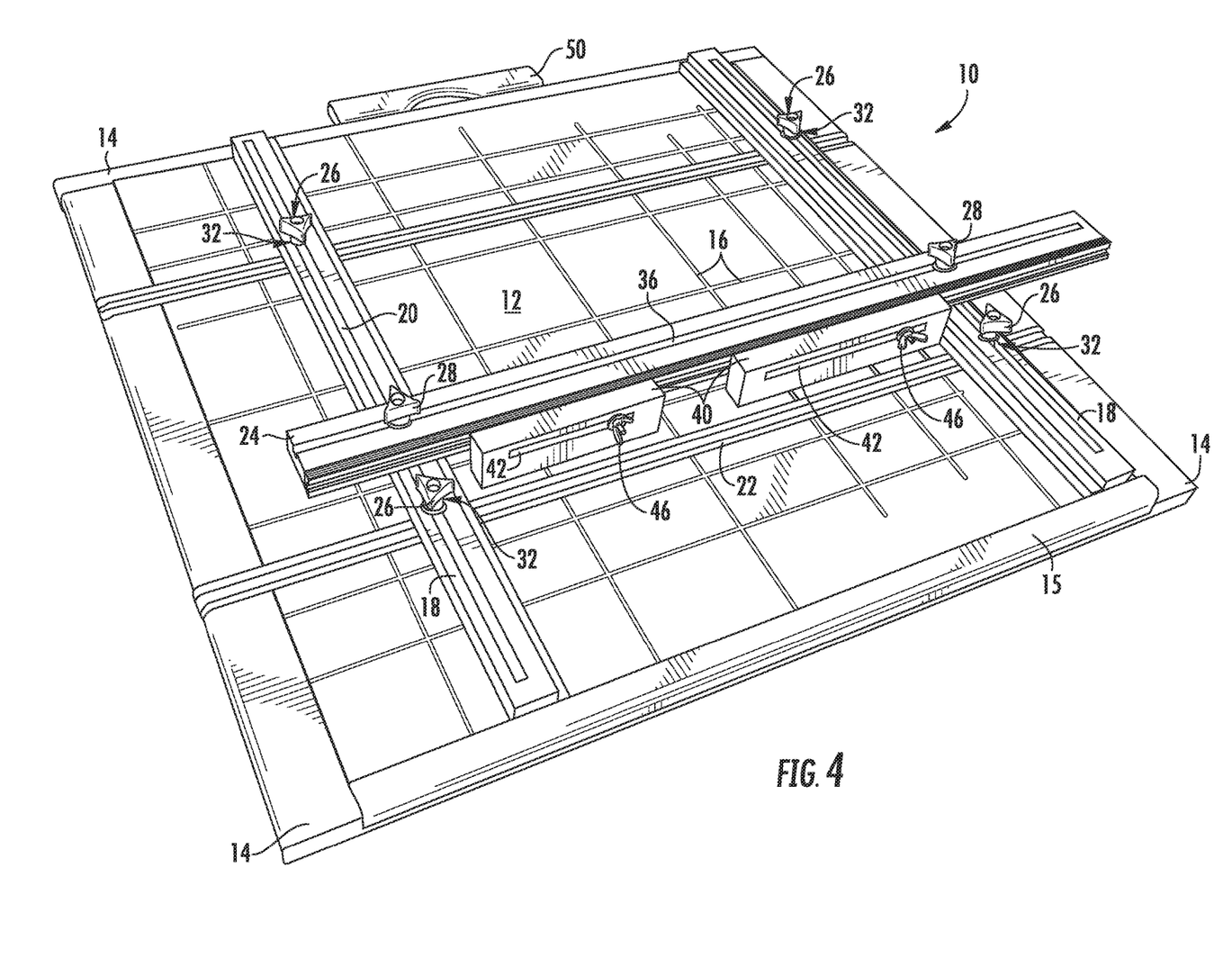
FIG. 4 is a perspective view illustrating the boundaries for a rectangular design.

Each side adjustable member 18 has at least two locking components 26 (shown as a triangular nut) having mounting bolts 32 that extends through the slot 20, as seen in FIG. 3. The head 34 of each mounting bolt 32 is retained within an embedded cross channel 22, so that the side adjustable members 18, can be moved toward or away from one another as stated above, and then when positioned as desired, the locking components 26 can be tightened to lock the side member 18 in place. Likewise, the slideable boundary support 24 has an elongated groove 36, extending there through, similar to slot 20. There are at least two locking fasteners 28 (shown as a triangular nut) having at least two mounting bolts 30 with a head, shown in dotted lines/relief in FIG. 3. The at least two mounting bolts 30 extend through both the elongated groove 36 and through slot 20. The slideable boundary support 24 can be moved toward or away from edge boundary 15, and then when positioned as desired, the locking fasteners 28 can be tightened to lock the slideable boundary support 24 in place. Thus the slideable boundary support 24 can be locked in place with respect to the side adjustable members 18 anywhere along the length of slot 20.

Slideable boundary support 24 has an elongated embedded channel 38 positioned along its side that faces the edge boundary 15. One or more movable blocks 40 each have a side slot 42, with a quick fastener 46 (shown as a wing nut) and a bolt 44 extending into elongated embedded channel 38. Each adjustable block 40 can be moved into a desired position and locked in place by tightening the quick fastener 46. Although one may argue that the blocks can be positioned anywhere along the elongated embedded channel 38 without the need for side slot 42 in block 40, the side slot 42 allows for the maximum use of the length of one or more of the adjustable blocks 40, as desired, particularly when one end of the block 40 is positioned snug against one of the boundary members, as shown in FIG. 4, 5, 7, or 8.

Figure 5:
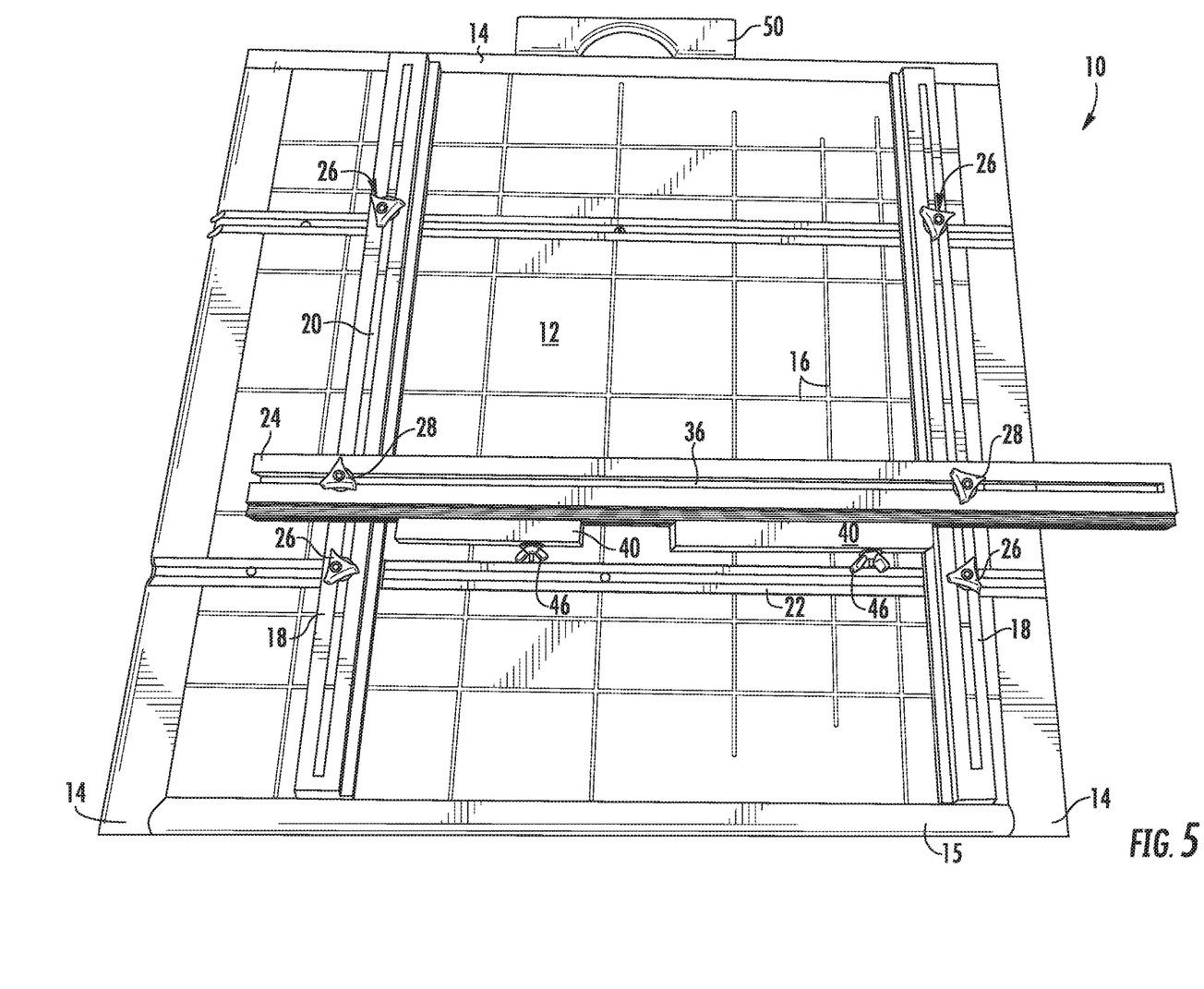
FIG. 5 is an overhead view illustrating the boundaries for a rectangular design.
Figure 6:
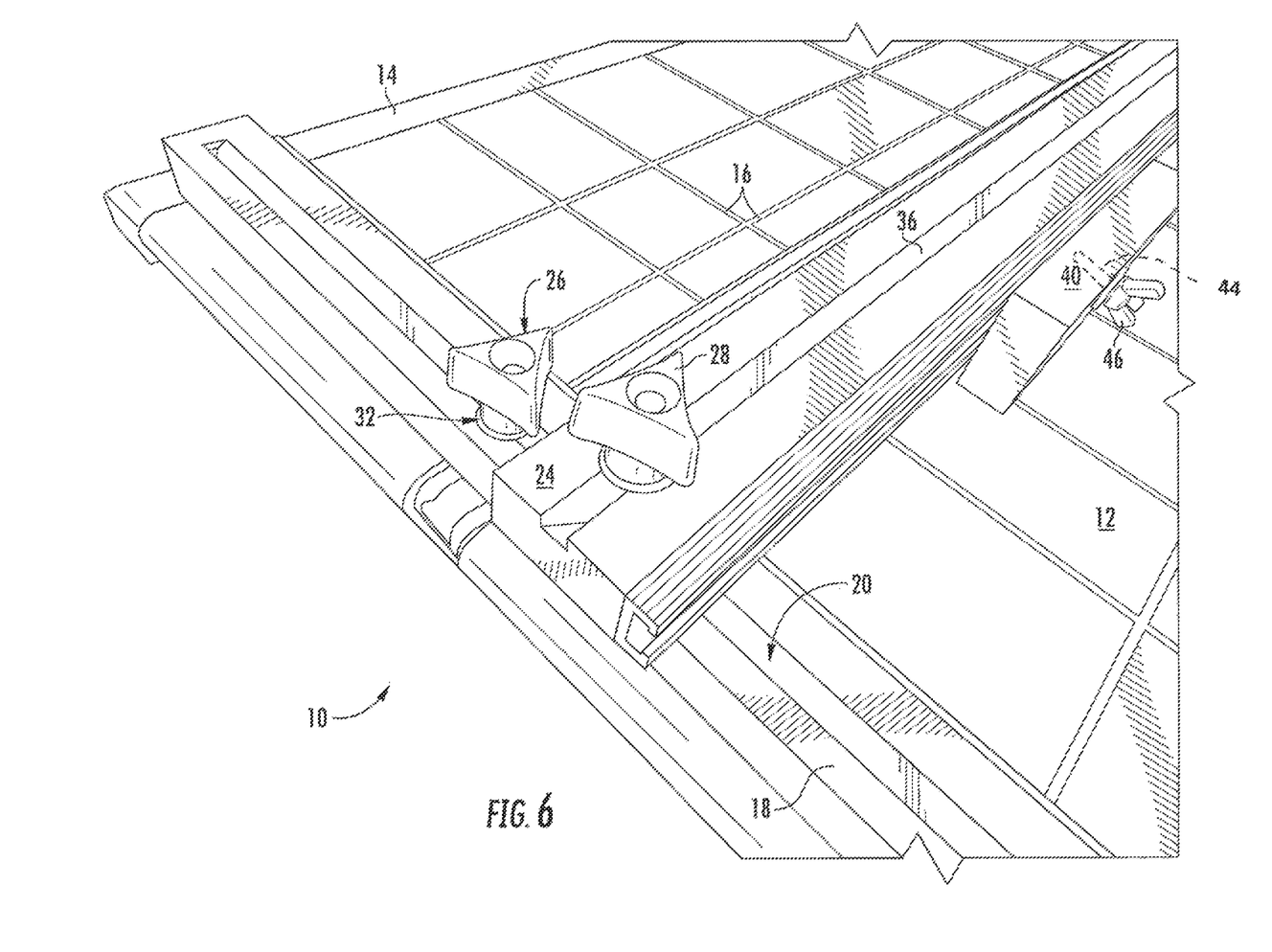
FIG. 6 is an expanded cut away view showing a portion of the side adjustable member and the slideable frame support.
Figure 7:
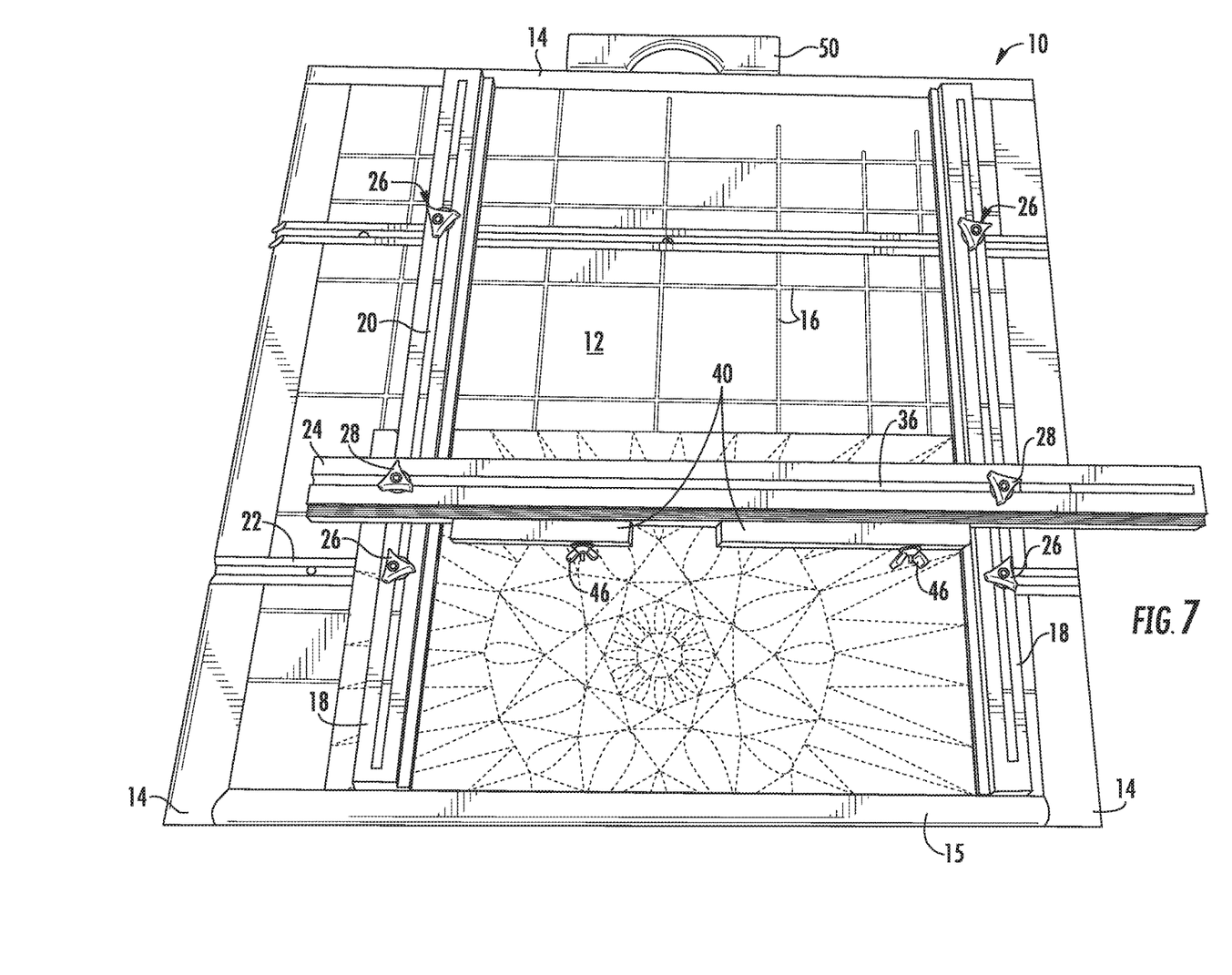
FIG. 7 is an overhead view of the support surface with a designed work of art.
Figure 8:
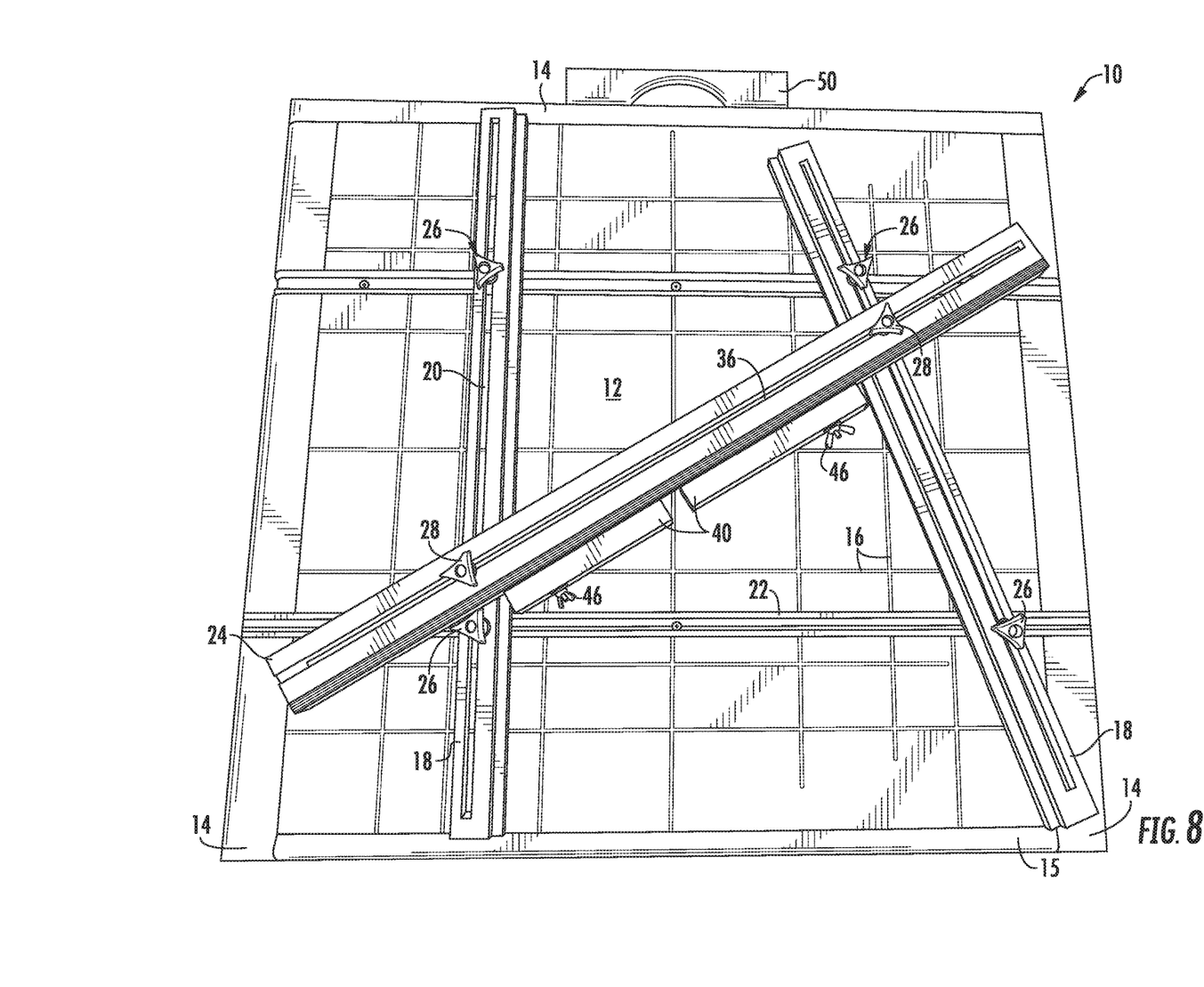
FIG. 8 is an overhead view having the shape of a 4 sided boundary having only two 90° angles.
Figure 9:
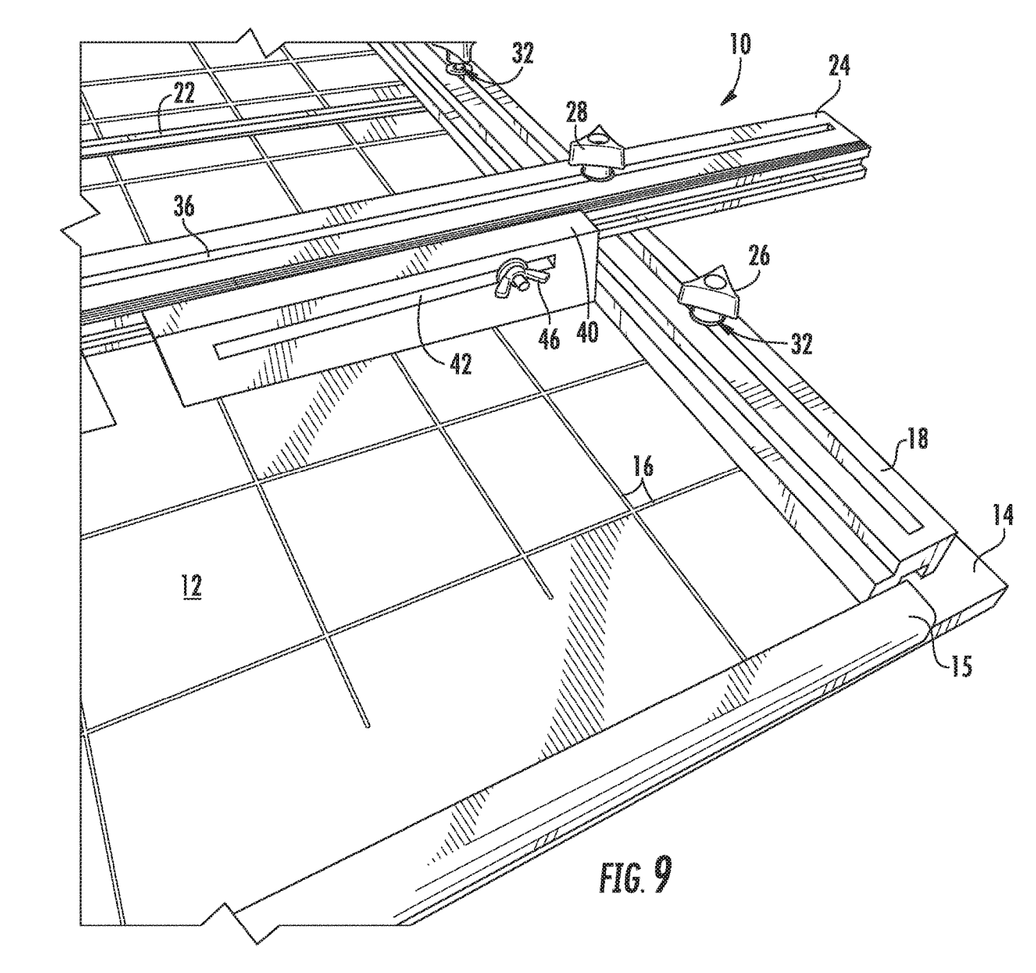
FIG. 9 is an expanded cut away view showing the edge boundary, the side adjustable member and the slideable frame support.

As shown in FIG. 3, an extension leg 48 is positioned beneath the central surface 12 to tilt the central surface 12 upwardly from the horizontal when the support surface 10 is placed on a horizontal surface, such as a table or counter top. As shown in FIGS. 5, 7 and 8, a handle 50 is positioned atop one of the surface frames 14 to allow for easy transporting of the support surface 10.

Although the support surface is described in certain terms and with certain functionality, the breath of the invention extends to all obvious limitations and extensions easily foreseeable to those skilled in the art.

ELEMENTS OF THE DRAWING

- 10—support structure
- 12—central surface
- 14—frame
- 15—edge boundary
- 16—guide lines
- 18—side adjustable member
- 20—slot
- 22—embedded cross channel
- 24—slideable boundary support
- 26—locking component
- 28—locking fastener
- 30—bolt
- 32—mounting bolt
- 34—head of mounting bolt
- 36—elongated groove
- 38—elongated embedded channel
- 40—adjustable blocks
- 42—side slot
- 44—bolt
- 46—quick fastener
- 48—extension leg
- 50—handle

What is claimed is:

1. A surface support for constructing a stained glass design, comprising: a flat central surface (12) with a top side, a bottom side, a left side, and a right side, surface frames (14) bounding on the top side, the bottom side, the left side, and the right side of the flat central surface (12), a stationery edge boundary (15) securely mounted to the surface frames (14) bounding the bottom side of the flat central surface (12), two embedded cross channels (22), fixedly positioned within said flat central surface and which do not extend above the flat central surface and extend from the left side to the right side of the flat central surface (12) parallel with the stationary edge boundary (15), two side adjustable members (18) each having an elongate slot (30), at least two mounting fasteners (32), each of which have a distal end (34) that extends through the elongate slot (20) on each side adjustable member (18) and extends into said embedded cross channel (33) and an upper locking component (26), thus allowing the side adjustable members (18) to be positioned toward or away from one another, and locked in place via the upper locking component (26), and a slideable boundary support (24) having a top side, a bottom side, a left side and a right side with an elongated groove (36) extending along its length and a locking fastener (28) to permit the slideable boundary support (24) to move toward or away from said stationary edge boundary (15) and to be securely locked in place with the locking fastener (28) when desired, the edge boundary (15) is approximately a thickness of the stained glass design, and two spaced-apart adjustable blocks (40) each having a top side, a bottom side, a left side and a right side, an elongated side slot (42) extends from said left side to said right side of said adjustable block (40) and is disposed longitudinally along said left side and said right side of said adjustable block, said adjustable block (40) is secured to said right side of said slidable boundary support (24) and said adjustable block (40) is secured to said slidable boundary support 24 by a quick fastener (46) and a bolt (44) extending into an elongated embedded channel 38 on said right side of said slidable boundary support (24), said left side of said adjustable block (40) contacts said right side of said slidable boundary support (24).

2. The surface support of claim 1, wherein each of the side adjustable members (18) have an elongated slot (20) to permit the slideable boundary support (24) to move toward or away from the stationary edge boundary (15) and locked in a desired position by locking fasteners (28).

3. The surface support of claim 1 wherein said flat central surface (12) has guidelines (16) to help accurately position the stained glass on the flat central surface.

4. The surface support of claim 1, further including an extension leg (48) positioned beneath the central surface (12) to support the surface support in an upright manner.

5. The surface support of claim 1, further comprising a handle (50) positioned atop the surface frame 14 bounding the top side of the central surface (12).

6. The surface support of claim 1, wherein the slidable boundary support (24) has an elongated embedded channel (38) along its side facing the stationary edge boundary (15), one or more moveable blocks (40) having a side slot (42) with a bolt (44) extending through the side slot (42) and into the elongated embedded channel (38) for engaging the moveable blocks (40) to the slidable boundary support (24).

* * * * *